Nov. 25, 1924.

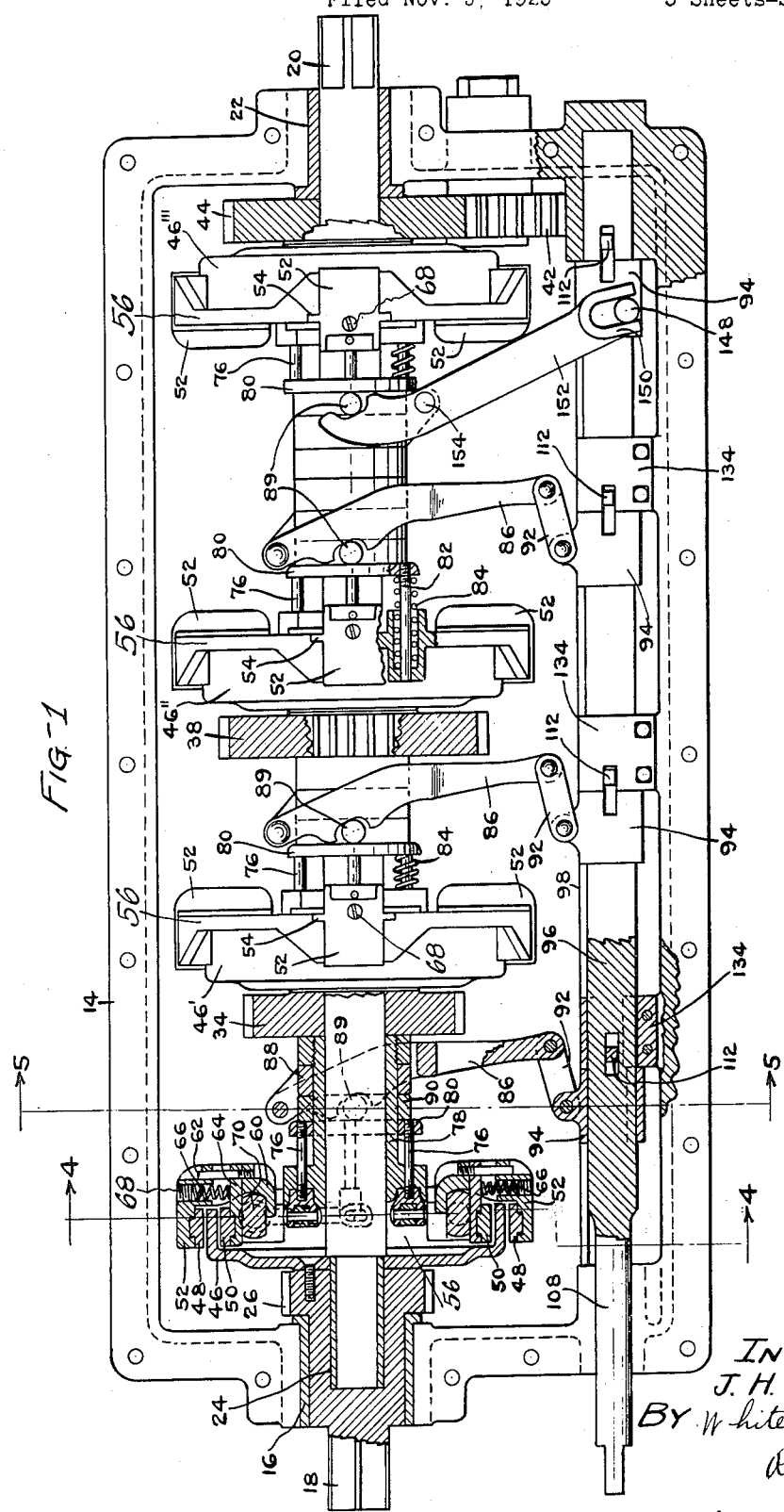

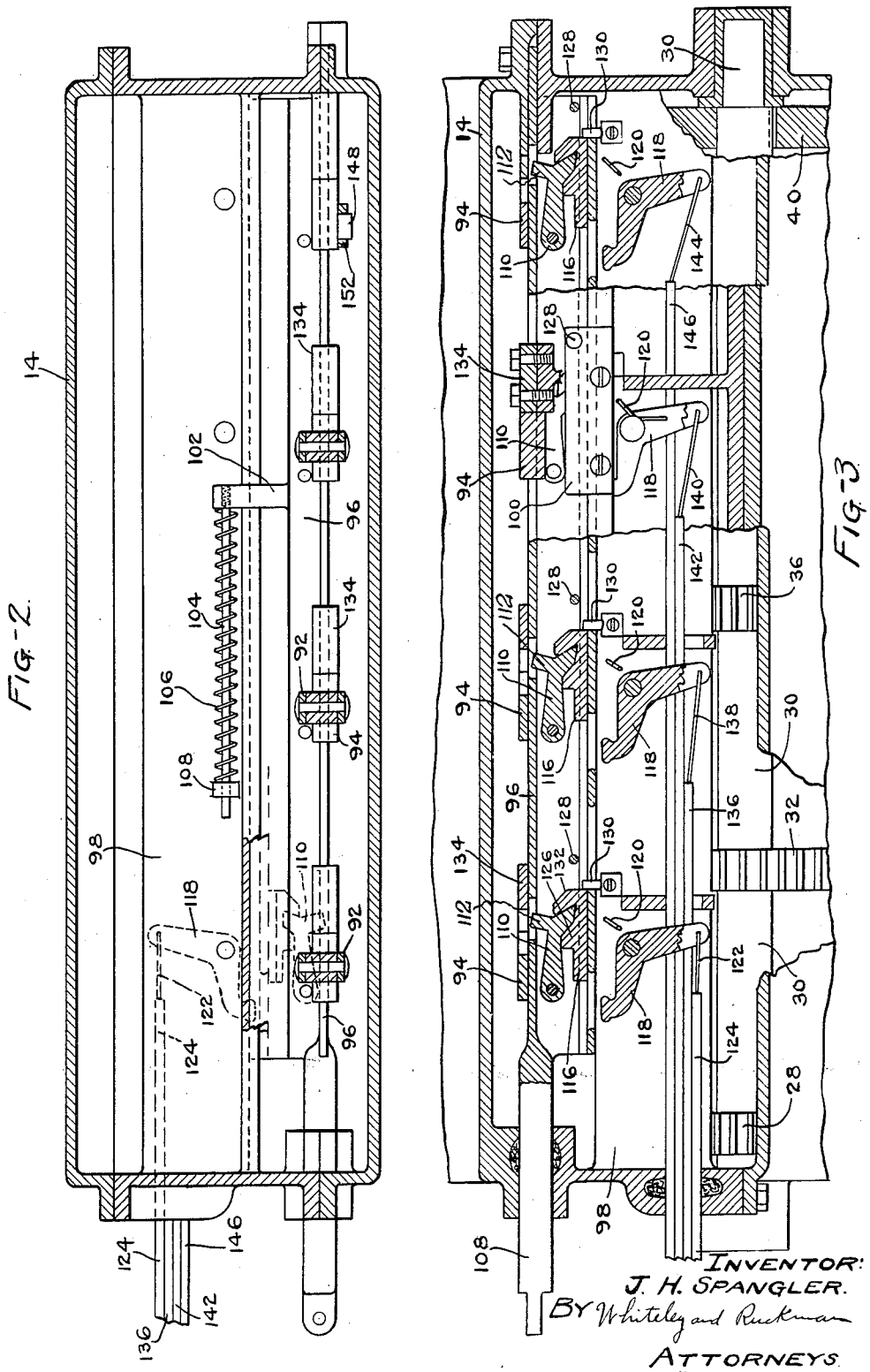

J. H. SPANGLER 1,516,623

TRANSMISSION DEVICE FOR MOTOR VEHICLES

Filed Nov. 5, 1923      5 Sheets-Sheet 3

INVENTOR:
J. H. SPANGLER.
BY Whiteley and
Ruckman
ATTORNEYS.

Nov. 25, 1924.  1,516,623
J. H. SPANGLER
TRANSMISSION DEVICE FOR MOTOR VEHICLES
Filed Nov. 5, 1923   5 Sheets-Sheet 4
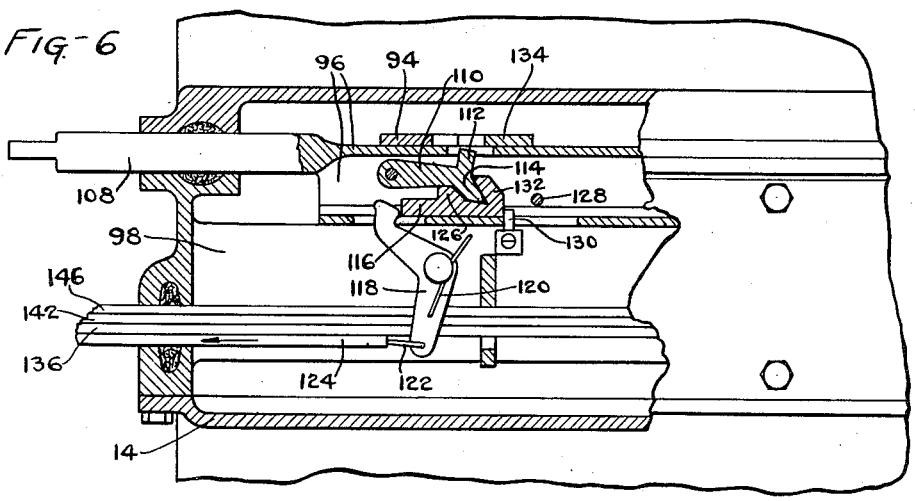
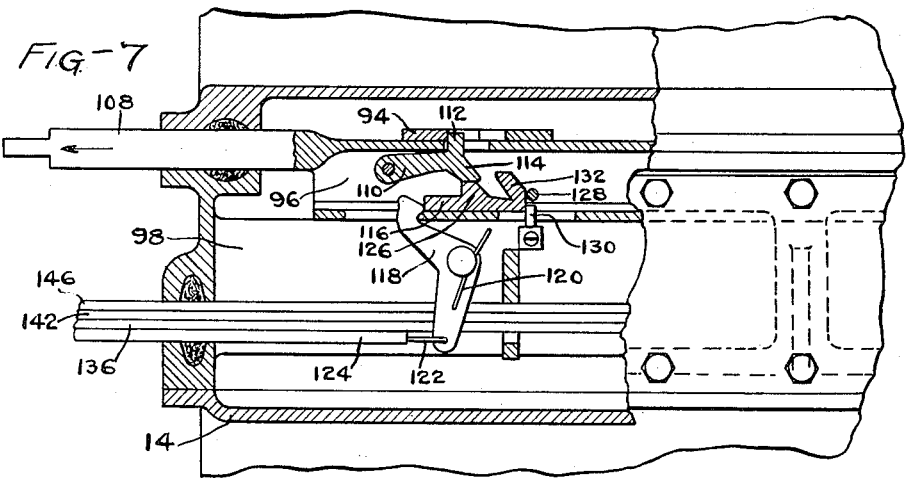
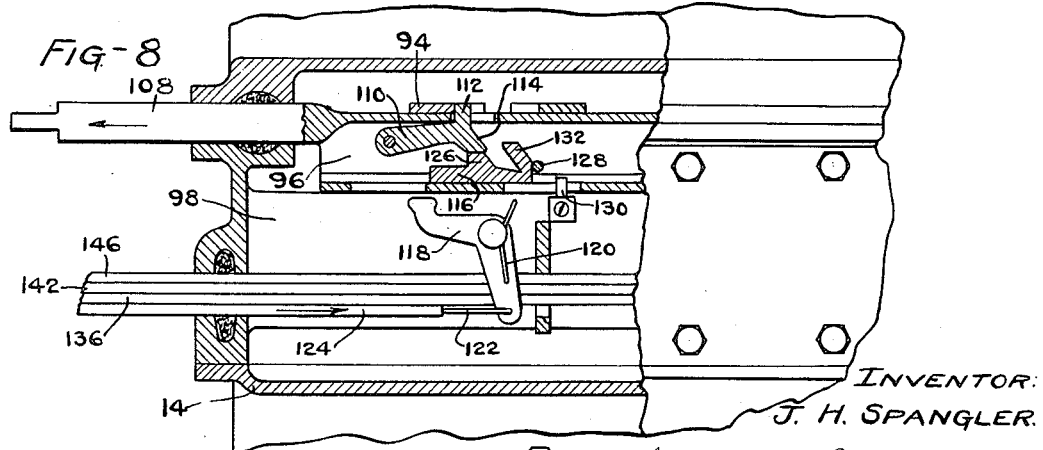
INVENTOR:
J. H. SPANGLER.
BY Whiteley and Ruckman
ATTORNEYS

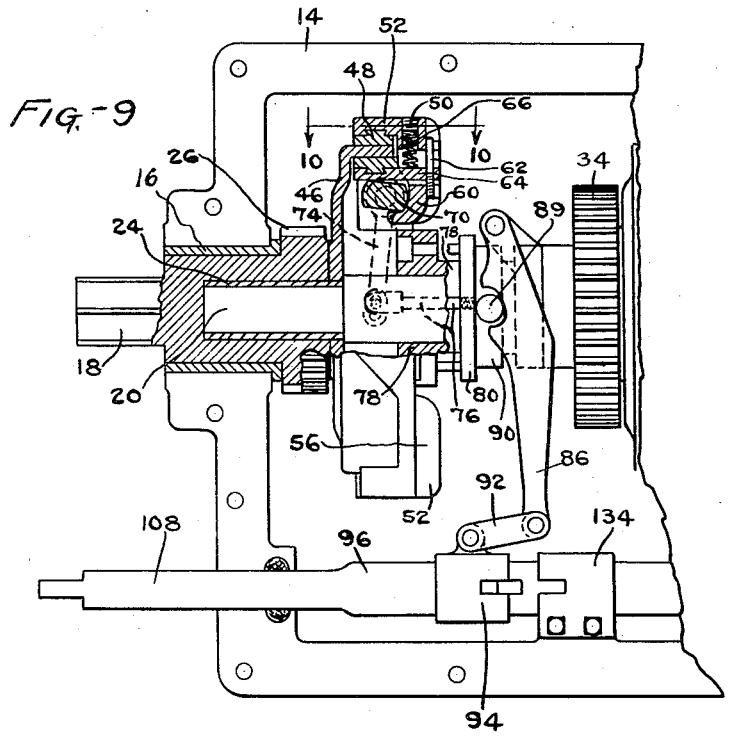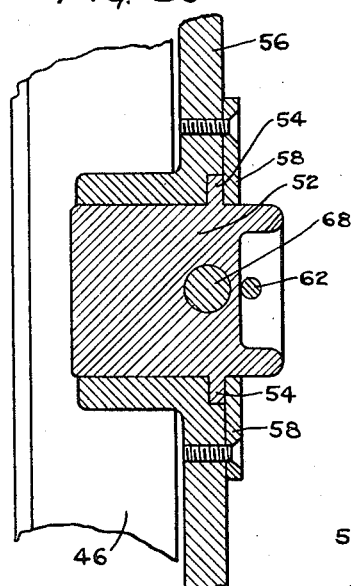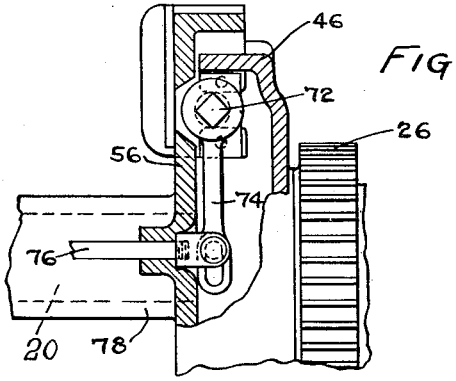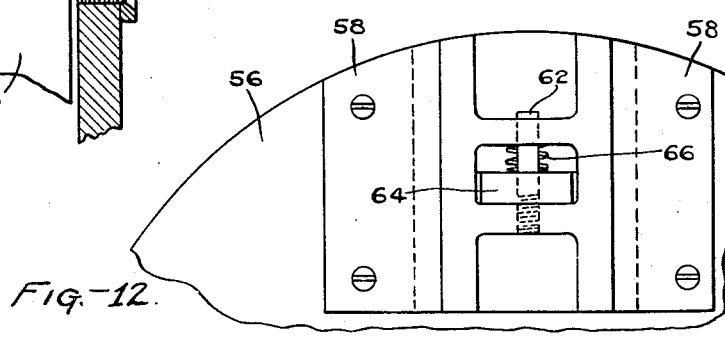

Patented Nov. 25, 1924.

1,516,623

UNITED STATES PATENT OFFICE.

JOHN H. SPANGLER, OF MINNEAPOLIS, MINNESOTA.

TRANSMISSION DEVICE FOR MOTOR VEHICLES.

Application filed November 5, 1923. Serial No. 672,766.

*To all whom it may concern:*

Be it known that I, JOHN H. SPANGLER, a citizen of the United States, residing at Minneapolis, in the county of Hennepin and State of Minnesota, have invented certain new and useful Improvements in Transmission Devices for Motor Vehicles, of which the following is a specification.

My invention relates to transmission devices for motor vehicles, and among the objects are to provide a device whereby different speeds and reverse may be selectively obtained without shock and jar and without liability of stripping gears.

I accomplish the objects of the invention by providing a construction in which no shifting of gears is involved but in which clutch mechanisms for the various speeds and for the reverse are operated by the driver according to the manner in which he wishes to drive the vehicle.

The full objects and advantages of my invention will appear in connection with the detailed description, and the novel features of my inventive idea will be particularly pointed out in the claims.

In the accompanying drawings which illustrate one of the forms in which my invention may be embodied,—

Figure 4:
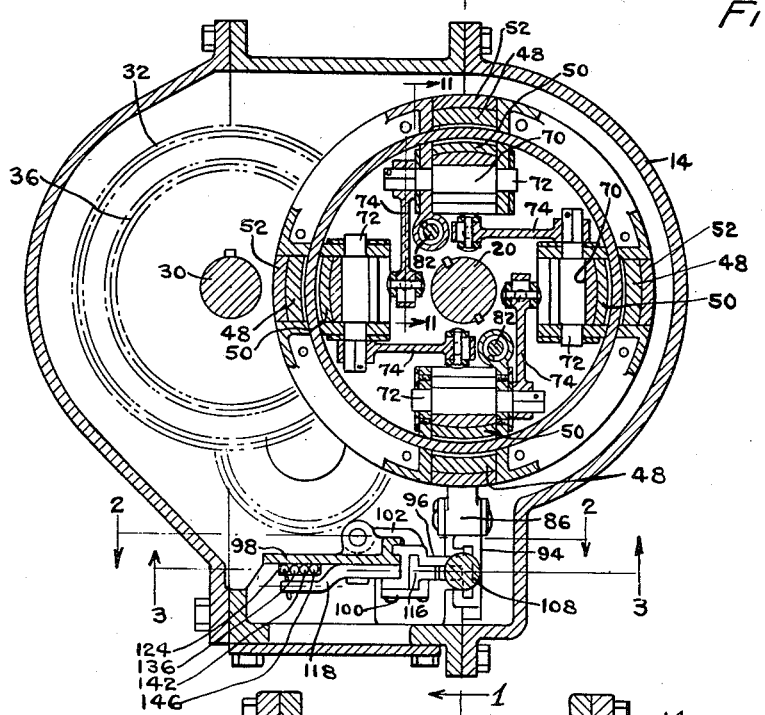
Figure 5:
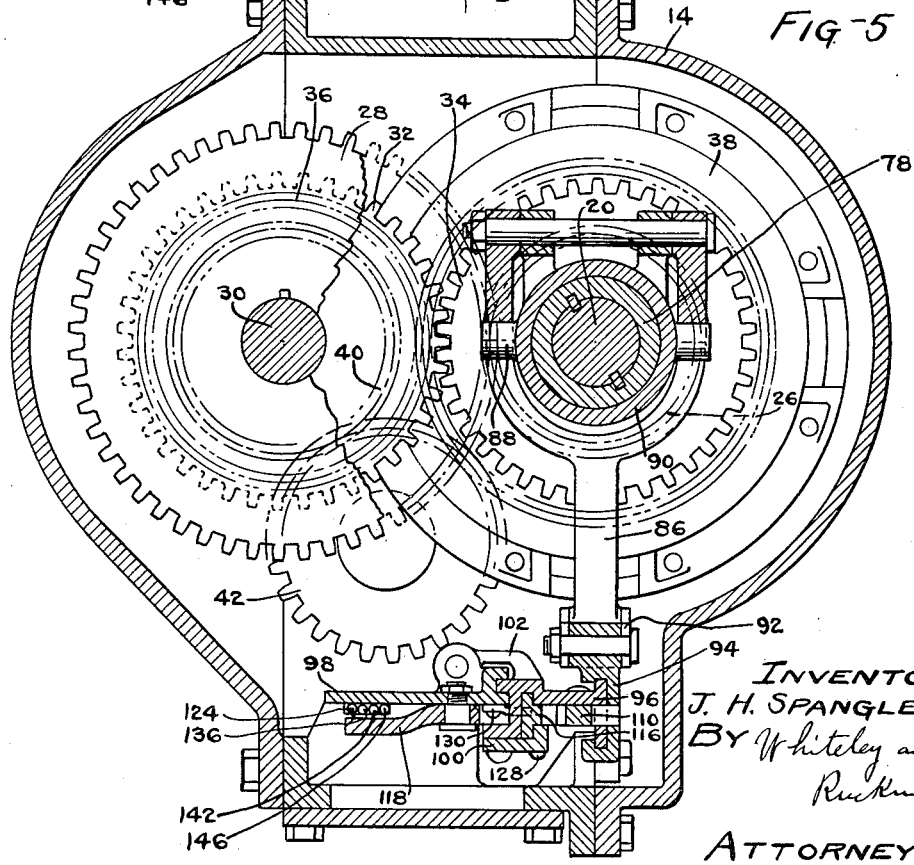

Fig. 1 is a view of the transmission device partly in elevation and partly in vertical longitudinal section on the line 1—1 of Fig. 4. Fig. 2 is a view in longitudinal horizontal section on the line 2—2 of Fig. 4 looking in the direction of the arrows. Fig. 3 is a view in longitudinal horizontal section on the line 3—3 of Fig. 4 looking in the direction of the arrows. Fig. 4 is a view in cross section on the line 4—4 of Fig. 1. Fig. 5 is a view substantially in cross section on line 5—5 of Fig. 1 with the position of the forward gears illustrated for the sake of completeness. Figs. 6, 7, and 8 are fragmentary views in section corresponding to Fig. 3 but showing the high speed control in different progressive positions. Fig. 9 is a fragmentary view corresponding in general to Fig. 1 but showing the high speed control in the fully operated position of Fig. 8. Fig. 10 is a detail view in horizontal section on the line 10—10 of Fig. 9. Fig. 11 is a detail view in vertical section on the line 11—11 of Fig. 4. Fig. 12 is a fragmentary face view of the portion of the device shown in Fig. 10.

Referring to the construction shown in the drawings, the numeral 14 designates in general a transmission casing in the forward end of which is secured a bushing 16 within which the rear end of the motor shaft 18 is rotatably mounted. A rear drive shaft 20 is rotatably mounted in a bushing 22 secured in the rear end of the casing and this latter shaft extends forwardly within the casing and is rotatably mounted in a bushing 24 located in a recess in the rear of the motor shaft 18. Fixed upon the rear end of the motor shaft within the transmission casing is a small gear 26. This gear meshes with a large gear 28 which is secured to a counter shaft 30 rotatably mounted in the transmission casing. Secured to the shaft 30 is a gear 32 which meshes with an intermediate speed gear 34 loosely mounted on the shaft 20. Secured to the shaft 30 is a gear 36 which meshes with a large slow speed gear 38 loosely mounted on the shaft 20, while also secured to the shaft 30 is a gear 40 meshing with an idler gear 42 which in turn meshes with a reversing gear 44 loosely mounted on the shaft 20. It is obvious that when the device is in neutral position, the motor shaft 18 will rotate without imparting any rotation whatever to the rear drive shaft 20. For high speed, the shaft 18 is clutched directly to the shaft 20. For intermediate speed, the gear 34 is clutched to the shaft 20. For slow speed, the gear 38 is clutched to the shaft 20, while for reverse, the gear 44 is clutched to the shaft 20. Similar clutching mechanisms are employed in each case, and this mechanism will now be described with particular reference to the high speed control, but so far as the mechanism is the same for the other speed controls, the same reference characters will be employed. A drum 46 is secured to the end of the shaft 18 adjacent the gear 26. Arranged for cooperation with the drum 46 are a number of exterior clutch shoes 48 and corresponding interior clutch shoes 50, the exterior and interior shoes being arranged in pairs. The exterior shoes 48 are carried by slidable members 52 having flanges 54 on opposite sides thereof which fit in recesses formed in an annular casting or supporting member 56 which is provided with lugs having openings to receive the slides 52 which are held in place by plates 58 as shown in Fig. 10. The slides 52 are extended to form flanges 60 and have recesses across which bolts 62 extend. The internal shoes 50 are carried by plates 64 which are slidable upon the bolts 62. The shoes are normally held away from the drum 46 by springs 66 held between the plates 64 and screw plugs 68 threaded into the slides 52 as shown at the left in Fig. 1.

Cams 70 are placed between the flanges 60 and the inner surfaces of the plates 64 so that when the cams are given a partial rotation, the shoes will be drawn toward each other and caused to engage the exterior and interior surfaces of the drum 46. The cams 70 are secured to shafts 72 rotatably carried by flanges on the casting 56, these shafts being connected by arms 74 with rods 76 slidable in lugs formed on the casting 56, which has a hub 78 keyed to the shaft 20 as will be apparent from Figs. 5 and 11. The rear ends of the rods 76 are fastened to a ring 80 to which are also fastened the rear ends of a pair of rods 82 surrounded by springs 84 so that the ring 80 is normally held in rearward position. The ring 80 may be forced forwardly at the proper time by means of a forked shifter arm 86 pivotally attached to lugs on a ring 88 within which the hub 78 is rotatable. The branches of the arm 86 engage lugs 89 carried by a ring 90, which in turn engages the rear side of the ring 80. The lower end of the arm 86 is connected by a link 92 with a slide 94 having the shape shown in Fig. 5 and positioned for sliding movement upon one of the branches of an angular shape bar 96 which itself is mounted for sliding movement in a slideway formed by fixed bars 98 and 100 attached inside the transmission casing. The bar 96 carries a lug 102 to which is secured a forwardly extending rod 104 surrounded by a coiled spring 106 interposed between the lug 102 and a fixed lug 108 as shown in Fig. 2. The angular bar 96 is held in rearward position by spring 106 except when it is brought into forward position which may be done in any suitable manner by means under the control of the driver. As shown, the bar 96 has a rod-like forward portion 108 extending slidably through the front wall of the transmission casing. This portion 108 may be connected in any suitable manner with a foot pedal so that when the foot pedal is held depressed, the bar 96 will be held in its forward position. A dog 110 is pivoted to the bar 96 and this dog has a lug 112 which when the dog is operated is caused to project through a slot in the bar 96 and into a slot in the slide 94. The dog 110 also has a camlike lug 114 which cooperates with a cam slide 116 which is in frictional engagement with the bar 96 so as to move therewith except when positively restrained. In order to thus restrain the movement of the cam slide, a lever 118 is intermediately pivoted to the fixed bar 98 as shown in Fig. 5 and is normally held by a spring 120 in the position shown in Figs. 3 and 8. A cord 122 it attached to one end of the lever 118. This cord extends through a tube 124 and its forward end is positioned near the driver with any suitable attachment so that it can be readily pulled by him when desired. When the cord 122 is pulled, the other end of the lever 118 is caused to move through a slot in an angular portion of the bar 96 so as to come in front of the cam slide 116 as shown in Fig. 6. The driver now depresses the foot pedal and causes the angular bar 96 to move forwardly as shown in Fig. 7. The cam slide 116 being thus held back, the cam lug 114 rides up on a cam projection 126 formed on the slide 116 and the lug 112 is caused to engage the slide 94. Continued forward movement of the bar 96 into the position shown in Fig. 8 causes the slide 94 to move forward and through the operating connections previously described the clutch shoes 48 and 50 are brought into clutching engagement with the drum 46 whereby the high speed of the motor shaft 18 is soon imparted to the drive shaft 20. There will be some slip of the clutch shoes relatively to the drum at first so that the speed of the drive shaft picks up the speed of the motor shaft gradually without jerk or shock. When the bar 96 reaches the position shown in Fig. 7 a pin 128 carried thereby engages the rear of the slide 116 so that this slide and the bar 96 continue together into the position shown in Fig. 8. When the cord 122 is released, the spring 120 swings the lever 118 back to its normal position as shown in Fig. 8 but the clutch engagement will be maintained as long as the bar 96 is held forwardly. When this bar is released, the spring 106 moves it back to normal position thereby releasing the clutch shoes from engagement with the clutch drum. A fixed pin 130 carried by the bar 100 acts as a stop for the cam slide 116 by engaging the rear thereof and causes this slide when retracted to always occupy the same rearward position. The cam slide 116 is provided with a second cam projection 132 which is engaged by the point of the cam lug 114 so that the dog 110 is brought into its normal position as shown in Fig. 6. A stop 134 serves to limit the backward movement of the slide 94.

As shown in Fig. 1, a drum 46' is secured to the intermediate speed gear 34, a drum 46'' is secured to the slow speed gear 38 and a drum 46''' is secured to the reversing gear 44. Clutching mechanism similar to that already described is associated with these drums and hence, a detailed description of the mechanism whereby the driver may obtain intermediate and slow speeds and reverse, is not necessary. A cord 138 extends through a tube 136 and is attached to the lever 118 associated with the intermediate speed control. A cord 140 extends through a tube 142 and is attached to the lever associated with the slow speed control, while a cord 144 extends through a tube 146 and is attached to the lever 118 associated with the reverse. By pulling the desired one of these cords, and then depressing the foot pedal, the driver may readily obtain anyone of the speeds or reverse. By referring to Fig. 1, it will be seen that the clutching mechanism associated with the reversing gear 44 is in front of the same instead of being at the rear as is the case with the other clutching mechanisms in relation to the gears with which they are associated. Therefore, the slide 94 associated with the reverse, is provided with a pin 148 which is engaged by the forked end 150 of a lever 152 pivoted at 154 and having its other end in engagement with the front side of the lugs 89 so that the ring 80 in this case is moved rearwardly instead of forwardly to initiate the clutching operation. The clutching mechanism is otherwise the same as that already described.

The operation and advantages of my invention have already been quite fully stated. When the driver wishes to back the vehicle, he pulls the cord 144 to swing the lever 118 which is associated with the reversing mechanism and then depresses the foot pedal so that the drive shaft is rotated in reverse direction through the gear 40, idler 42, gear 44 and the clutching mechanism associated with the latter gear. When he wishes to drive at slow speed, he pulls the cord 140 and depresses the foot pedal so that the drive shaft is rotated through the gear 36, the gear 38, and the clutch mechanism associated with the latter gear. When he wishes to drive at intermediate speed, he pulls the cord 136 and depresses the foot pedal so that the drive shaft is rotated through the gear 32, the gear 34, and the clutch mechanism associated with the latter gear. When he wishes to drive at high speed, he pulls the cord 122 and depresses the foot pedal so that the drive shaft is rotated by clutching it directly to the motor shaft. In this manner, all shifting of the gears with liability of stripping the same is eliminated, and on account of the fact that when the various clutch mechanisms are operated, there will be slipping for a short time of the clutch drums between the exterior and interior shoes, shocks and jars are avoided. The speed of the drums is, however, very shortly although gradually imparted to the clutch shoes carried by the drive shaft. The speed which has been selected may be maintained as long as desired and a change may be effected in the manner which has been described to another speed or to reverse.

I claim:

1. In a transmission device for motor vehicles, the combination of a drive shaft, a countershaft spaced therefrom, a number of gear wheels loosely mounted on said drive shaft, corresponding gear wheels secured to said countershaft and meshing respectively with said loose gear wheels, clutch drums carried by said loose gear wheels, supporting members secured to said drive shaft adjacent said clutch drums, clutch shoes movably mounted on said supporting members, means for normally holding said shoes disengaged from said drums, a slidable bar adapted to be slid by the driver, mechanism for forcing said shoes into engagement with said drums, slides frictionally engaged with said bar and adapted when restrained from movement therewith to cause said mechanism to operate, and means under the control of the driver for selectively restraining said slides.

2. In a transmission device for motor vehicles, the combination of a drive shaft, a countershaft spaced therefrom, a number of gear wheels loosely mounted on said drive shaft, corresponding gear wheels secured to said countershaft and meshing respectively with said loose gear wheels, clutch drums carried by said loose gear wheels, supporting members secured to said drive shaft adjacent said clutch drums, clutch shoes movably mounted on said supporting members, means for normally holding said shoes disengaged from said drums, a slidable bar adapted to be slid by the driver, dogs pivotally attached to said bar, mechanism adapted to be operated by said dogs to force said shoes into engagement with said drums, slides frictionally engaged with said bar and adapted when restrained from movement therewith to move said dogs into position for operating said mechanism, and means under the control of the driver for selectively restraining said slides.

3. In a transmission device for motor vehicles, the combination of a drive shaft, a countershaft parallel therewith, a number of gear wheels loosely mounted on said drive shaft, corresponding gear wheels secured to said countershaft and meshing respectively with said loose gears, clutch drums carried by said loose gear wheels, clutch shoes movably mounted on said supporting members, means for normally holding said shoes disengaged from said drums, a slidable bar adapted to be slid by the driver, dogs pivotally attached to said bar, mechanism adapted to be operated by said dogs to force said shoes into engagement with said drums, cam slides frictionally engaged with said bar and adapted when restrained from movement therewith to move said dogs into position for operating said mechanism and means under the control of the driver for selectively restraining said cam slides.

4. In a transmission device for motor vehicles, the combination of a drive shaft, a counter shaft parallel therewith, a number of gear wheels loosely mounted on said drive shaft, corresponding gear wheels secured to said countershaft and meshing respectively with said loose gear wheels, clutch drums carried by said loose gear wheels, supporting members secured to said drive shaft adjacent said clutch drums, clutch shoes slidably mounted on said supporting members, means for normally holding said shoes disengaged from said drums, cams adapted to force said shoes into engagement with said drums, operating slides, connections between said slides and cams, a slidable bar adapted to be slid by the driver, dogs pivotally attached to said bar, cam slides frictionally engaged with said bar and adapted when restrained from movement therewith to move said dogs into engagement with said operating slides for causing the latter to operate said cams, and means under the control of the driver for selectively restraining said cam slides.

5. In a transmission device for motor vehicles having a motor shaft and a drive shaft in axial alinement with each other, a small gear secured to the motor shaft, a counter shaft parallel with said drive shaft, a gear secured to said counter shaft in mesh with said small gear, an intermediate speed gear loosely mounted on the drive shaft, a gear secured to said countershaft in mesh with said intermediate speed gear, a slow speed gear loosely mounted on the drive shaft, a gear secured to said countershaft in mesh with said slow speed gear, clutch drums secured to said small gear, said intermediate speed gear, and said slow speed gear, supporting members secured to said drive shaft adjacent said clutch drums, clutch shoes slidably mounted on said supporting members, means for normally holding said shoes disengaged from said drums, a slidable bar adapted to be slid by the driver, mechanism for forcing said shoes into engagement with said drums, slides frictionally engaged with said bar and adapted when restrained from movement therewith to cause said mechanism to operate and means under the control of the driver for selectively restraining said slides.

6. In a transmission device for motor vehicles having a motor shaft and a drive shaft in axial alinement with each other, a small gear secured to the motor shaft, a countershaft parallel with said drive shaft, a gear secured to said countershaft in mesh with said small gear, an intermediate speed gear loosely mounted on the drive shaft, a gear secured to said counter shaft in mesh with said intermediate speed gear, a slow speed gear loosely mounted on the drive shaft, a gear secured to said countershaft in mesh with said slow speed gear, a reversing gear loosely mounted on the drive shaft, an idler gear meshing with said reversing gear, a gear secured to said countershaft in mesh with said idler gear, clutch drums secured to said small gear, said intermediate speed gear, said slot speed gear, and said reversing gear, supporting members secured to the drive shaft adjacent said clutch drums, clutch shoes slidably mounted on said supporting members, means for normally holding said shoes disengaged from said drums, a slidable bar adapted to be slid by the driver, mechanism for forcing said shoes into engagement with said drums, slides frictionally engaged with said bar and adapted when restrained from movement therewith to cause said mechanism to operate, and means under the control of the driver for selectively restraining said slides.

7. In a transmission device for motor vehicles having a motor shaft and a drive shaft, a transmission casing within which near one end thereof said shafts are juxtaposed in alinement with each other, a small gear secured to the motor shaft, a counter shaft mounted in said transmission casing, a gear secured to said counter shaft in mesh with said small gear, an intermediate speed gear loosely mounted on the drive shaft, a gear secured to said counter shaft in mesh with said intermediate speed gear, a slow speed gear loosely mounted on the drive shaft, a gear secured to said counter shaft in mesh with said slow speed gear, a reversing gear loosely mounted on the drive shaft, an idler gear meshing with said reversing gear, a gear secured to said counter shaft in mesh with said idler gear, clutch drums secured to said small gear, said intermediate speed gear, said slow speed gear, and said reversing gear, castings secured to the drive shaft adjacent said clutch drums, clutch shoes slidably mounted on said castings, means for normally holding said shoes disengaged from said drums, cams adapted to force said shoes into engagement with said drums, operating slides, connections between said slides and cams, a slidable bar adapted to be slid forwardly by the driver, a spring for normally holding said bar retracted, dogs pivotally attached to said bar, cam slides frictionally engaged with said bar and adapted when restrained from movement with said bar to move said dogs into engagement with said operating slides for causing the latter to operate said cams, and means under the control of the driver for selectively restraining said cam slides.

In testimony whereof I hereunto affix my signature.

JOHN H. SPANGLER.